(12) United States Patent
Jin et al.

(10) Patent No.: US 10,894,739 B2
(45) Date of Patent: Jan. 19, 2021

(54) REMOVAL OF INORGANIC COATINGS FROM GLASS SUBSTRATES

(71) Applicant: CORNING INCORPORATED, Corning, NY (US)

(72) Inventors: Yuhui Jin, Painted Post, NY (US); Aize Li, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 20 days.

(21) Appl. No.: 15/356,785

(22) Filed: Nov. 21, 2016

(65) Prior Publication Data

US 2017/0144923 A1   May 25, 2017

Related U.S. Application Data

(60) Provisional application No. 62/258,640, filed on Nov. 23, 2015.

(51) Int. Cl.
| | | |
|---|---|---|
| *C03C 15/00* | (2006.01) | |
| *C03C 17/32* | (2006.01) | |
| *C03C 3/097* | (2006.01) | |
| *C03C 4/18* | (2006.01) | |
| *C03C 21/00* | (2006.01) | |

(Continued)

(52) U.S. Cl.
CPC .............. *C03C 15/00* (2013.01); *C03C 3/097* (2013.01); *C03C 4/18* (2013.01); *C03C 17/32* (2013.01); *C03C 21/002* (2013.01); *C03C 2204/00* (2013.01); *C03C 2218/33* (2013.01); *C09K 13/02* (2013.01); *C09K 13/06* (2013.01); *C09K 13/08* (2013.01)

(58) Field of Classification Search
CPC ....... C03C 15/00; C03C 17/32; C03C 21/002; C03C 4/18; C03C 3/097; C03C 2218/33; C03C 2204/00; C09K 13/02; C09K 13/06; C09K 13/08
See application file for complete search history.

(56) References Cited

U.S. PATENT DOCUMENTS 3,616,098 A * 10/1971 Falls ........................ C03C 15/00
                                                              216/91
3,642,549 A *  2/1972 Couture .................. C03C 15/00
                                                              216/17
(Continued)

FOREIGN PATENT DOCUMENTS

| CN | 1836061 A | 9/2006 |
|---|---|---|
| CN | 101139712 A | 3/2008 |

(Continued)

OTHER PUBLICATIONS

English machine translation of WO 2005/017230 A1, Etching solution for titanium-containing layer and method for etching titanium-containing layer. (Year: 2005).*

(Continued)

*Primary Examiner* — Anita K Alanko
(74) *Attorney, Agent, or Firm* — Kevin M. Johnson

(57) ABSTRACT

Methods of etching an inorganic layer on a glass substrate are described, the methods comprising contacting the glass substrate including an inorganic layer with an etching solution comprising a polar organic solvent and an etchant, wherein the inorganic layer is removed at an inorganic layer etching rate and the glass substrate is etched as a glass etching rate.

29 Claims, 3 Drawing Sheets

(51) Int. Cl.
 *C09K 13/02* (2006.01)
 *C09K 13/06* (2006.01)
 *C09K 13/08* (2006.01)

(56) References Cited

U.S. PATENT DOCUMENTS

| | | | |
|---|---|---|---|
| 4,273,826 A | 6/1981 | McCollister et al. | |
| 4,921,626 A * | 5/1990 | Rhodenbaugh | C03C 15/00 216/90 |
| 4,978,469 A * | 12/1990 | Seaman, Jr. | C11D 1/72 134/22.17 |
| 5,426,012 A * | 6/1995 | Yokoya | G03G 5/0514 430/56 |
| 6,379,569 B1 | 4/2002 | Rouberol | |
| 6,534,240 B1 * | 3/2003 | Hoshi | B41C 1/1041 101/453 |
| 7,276,181 B2 * | 10/2007 | Miwa | C03C 15/00 216/109 |
| 8,058,219 B2 * | 11/2011 | Rath | C09D 9/04 134/1.3 |
| 8,158,543 B2 | 4/2012 | Dejneka et al. | |
| 8,431,502 B2 | 4/2013 | Dejneka et al. | |
| 8,586,492 B2 | 11/2013 | Barefoot et al. | |
| 8,623,776 B2 | 1/2014 | Dejneka et al. | |
| 8,652,978 B2 | 2/2014 | Dejneka et al. | |
| 8,756,262 B2 | 6/2014 | Zhang | |
| 8,759,238 B2 | 6/2014 | Chapman et al. | |
| 8,765,262 B2 | 7/2014 | Gross | |
| 8,802,581 B2 | 8/2014 | Dejneka et al. | |
| 8,951,927 B2 | 2/2015 | Dejneka et al. | |
| 8,969,226 B2 | 3/2015 | Dejneka et al. | |
| 9,290,413 B2 | 3/2016 | Dejneka et al. | |
| 2004/0043629 A1 * | 3/2004 | Lee | H01L 21/31053 438/775 |
| 2005/0115925 A1 * | 6/2005 | Paraschiv | H01L 21/31111 216/96 |
| 2007/0218700 A1 * | 9/2007 | Wiegand | H01L 21/31111 438/756 |
| 2007/0249139 A1 * | 10/2007 | Gadkaree | H01L 21/30604 438/458 |
| 2008/0041823 A1 * | 2/2008 | La | C03C 15/00 216/97 |
| 2011/0053378 A1 * | 3/2011 | Baiocchi | B81C 1/00801 438/706 |
| 2012/0135226 A1 | 5/2012 | Bookbinder et al. | |
| 2013/0004758 A1 | 1/2013 | Dejneka et al. | |
| 2013/0122284 A1 | 5/2013 | Gross | |
| 2013/0199925 A1 * | 8/2013 | Cao | C23C 14/345 204/192.15 |
| 2014/0106172 A1 | 4/2014 | Dejneka et al. | |
| 2014/0162036 A1 | 6/2014 | Marcellus et al. | |
| 2014/0186632 A1 | 7/2014 | Dejneka et al. | |
| 2014/0329660 A1 | 11/2014 | Barefoot et al. | |
| 2015/0187965 A1 * | 7/2015 | Stockum | H01L 31/1804 438/98 |
| 2015/0239775 A1 | 8/2015 | Amin et al. | |
| 2016/0257603 A1 | 9/2016 | Bookbinder et al. | |

FOREIGN PATENT DOCUMENTS

| | | |
|---|---|---|
| CN | 101438395 A | 5/2009 |
| WO | 2005017230 A1 | 2/2005 |

OTHER PUBLICATIONS

International Search Report and Written Opinion PCT/US2016/062991 dated May 17, 2017.
Chinese Patent Application No. 201680068501X Office Action dated Oct. 12, 2020; 10 Pages; Chinese Patent Office.

\* cited by examiner

REMOVAL OF INORGANIC COATINGS FROM GLASS SUBSTRATES

CROSS-REFERENCE TO RELATED APPLICATIONS

This application claims the benefit of priority under 35 U.S.C. § 119 of U.S. Provisional Application Ser. No. 62/258,640 filed on Nov. 23, 2015, the content of which is relied upon and incorporated herein by reference in its entirety.

BACKGROUND

The disclosure relates processes for removing inorganic coatings from glass substrates, particularly glass substrates that are used as cover glass for handheld devices with display screens.

Handheld electronic devices such as mobile phones and tablets include a cover substrate, which is typically a glass and referred to as a cover glass. A cover glass may contain various layers of coatings such as an anti-reflective (AR) coating, a coating to reduce fingerprints, which may be an oleophobic coating, and one or more ink coatings for functionality and aesthetic purposes. A cover glass manufacturing process typically involves application of one or more of these aforementioned coatings, which may be organic or inorganic coatings. For many cover glasses, there is a multilayer inorganic antireflective coating over which an organic ink coating is applied, which provides an enhanced color appearance. Part of the manufacturing process of cover glass includes selectively removing one or more of the coating layers from the glass substrate from the viewing area of the cover glass because the coatings reduce the ability to view the display. Removal of one or more of the coating layers typically involves contacting the coating layers with a stripping or etching solution. The coating removal process should be conducted without damaging the glass substrate.

SUMMARY

Embodiments of the disclosure pertain methods of etching an inorganic layer on a glass substrate comprising contacting the glass substrate including an inorganic layer with an etching solution comprising a polar organic solvent and an etchant, wherein the inorganic layer is removed at an inorganic layer etching rate and the glass substrate is etched as a glass etching rate.

Another embodiment pertains to a method of controlling the etch rate of a glass substrate including an inorganic layer, the method comprising contacting the glass substrate including the inorganic layer with an etching solution comprising a polar organic solvent and an etchant selected from HCl, $NH_4HF_2$, HF, NaOH, KOH, tetramethyl ammonium hydroxide, and combinations thereof, wherein the inorganic layer includes titanium and the inorganic layer is removed at an inorganic layer etching rate and the glass substrate is etched as a glass etching rate and the glass substrate comprises an ion exchanged glass composition with a compressive stress layer having a compressive depth of layer of at least 10 μm and extending from a surface of the glass to the depth of layer, and wherein the compressive layer is under a compressive stress of at least about 300 MPa.

These and other aspects, advantages, and salient features will become apparent from the following detailed description, the accompanying drawings, and the appended claims.

DETAILED DESCRIPTION

As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass substrate" and "glass substrates" are used in their broadest sense to include any object made wholly or partly of glass. Unless otherwise specified, all glass compositions are expressed in terms of mole percent (mol %) and all ion exchange bath compositions are expressed in terms of weight percent (wt %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

According to one or more embodiments, "handheld device" refers to a portable electronic device that has a display screen. Non-limiting examples of such handheld devices include a mobile telephone, a reading device, a music device, a viewing device and a navigation device. Non-limiting examples of such devices are iPhone®, Nook®, iPod®, iPad®, Droid®, Kindle® and GPS navigation systems.

Figure 1:
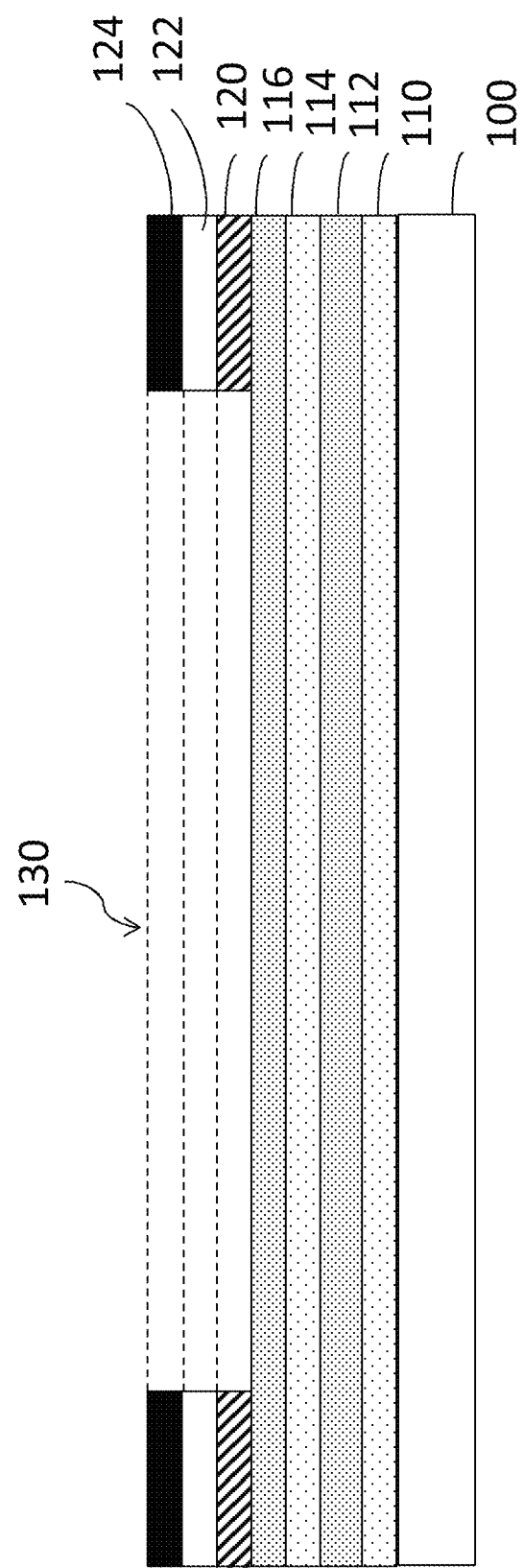
FIG. 1 is a schematic cross-sectional view of a glass substrate after an etching process.

As will be described further below, the present disclosure pertains to removal of one or more layers or coatings from a glass substrate that is used as a cover glass for a handheld device that has a display screen. As part of the manufacturing process to provide better transmission through the viewable area of a display screen etching of one or more organic or inorganic layers is performed on such glass substrates. Referring to FIG. 1, a glass substrate 100 used as a cover glass for a handheld device typically has a plurality of antireflective layers, for example, a first antireflective layer 110, a second antireflective layer 112, a third antireflective layer 114, and a fourth antireflective layer 116. The number and arrangement of antireflective layers is exemplary only and not intended to be limiting. The antireflective layers may comprise alternating layers of inorganic materials, for example, $SiO_2$ and a titanium containing layer (e.g., $TiO_2$/TiC), or other materials such as $Al_2O_3$. Various organic layers may be deposited on the antireflective layers, for example, a first organic layer 120, a second organic layer 122 and a third organic layer 124. These organic layers may include ink or coloring for surface and aesthetic effects. During the manufacturing process, glass substrate viewing area 130 may be etched or stripped to remove or reduce one or more of the layers 110, 112, 114, 116, 120, 122, and/or 124. Etching or stripping is achieved by selectively contacting an area of the substrate 130 to be etched with an etching or stripping solution. In one or more embodiments, the antireflective layers 110, 112, 114, 116 collectively have a total thickness in the range of 5 nm and 200 nm, for example, 10 nm, 20 nm, 30 nm, 40, nm, 50 nm, 60 nm, 70 nm, 80 nm, 90 nm, 100 nm, 110 nm, 120 nm, 130 nm, 140 nm, 150 nm, 160 nm, 170 nm, 180 nm, or 190 nm.

Etching or stripping solutions comprising water and an etchant are typically used during etching or stripping. Suitable exemplary etchants include HCl, $NH_4HF_2$, HF, NaOH, KOH, tetramethyl ammonium hydroxide, and combinations thereof, which may be diluted in water at various concentration (e.g. 10%). The substrates are contacted with the etching solution, for example by dipping, spraying or wiping at an appropriate temperature and for a suitable time to remove the desired amount of coating or layer. In an example of one suitable process, a substrate having a coating or layer thereon to be removed are loaded in a cassette holder, and the holder containing the substrates is soaked in a bath containing etchant at the desired temperature and for a desired duration of time to achieve the desired amount of coating to be removed. Physical agitation may be used in the bath if desired. Upon removal from the etching solution, the substrates are rinsed in water to remove extra etchant residue. The substrates are then are visually inspected to evaluate whether the coating is removed or not, and if the glass substrate has been damaged or not.

Glass substrates according to one or more embodiments can be selected from soda lime glass, alkali aluminosilicate glass, alkali containing borosilicate glass and alkali aluminoborosilicate glass. In one or more embodiments, the substrate is a glass, and the glass can be strengthened, for example, heat strengthened, tempered glass, or chemically strengthened glass. In one or more embodiments, strengthened glass substrates have a compressive stress (CS) layer with a CS extending within the chemically strengthened glass from a surface of the chemically strengthened glass to a compressive stress depth of layer (DOL) of at least 10 μm to several tens of microns deep. In one or more embodiments, the glass substrate is a chemically strengthened glass substrate such as Corning Gorilla® glass.

In strengthened glass substrates, there is a stress profile in which there is a compressive stress (CS) on the surface and tension (central tension, or CT) in the center of the glass. According to one or more embodiments, the screen cover can be thermally strengthened, chemically strengthened, or a combination of thermally strengthened and chemically strengthened.

Surprisingly, it was determined that contacting glass substrates with etching or stripping solutions to remove one or more organic or inorganic coatings or layers caused the underlying glass substrate to be etched such that the compressive stress at the surface of the glass substrate was reduced. United States Patent Application Publication Number US20140162036 explains that acid etching addresses the fact that glass strength is extremely sensitive to the size and the tip shape of surface flaws. US20140162036 further states that it is believed that the acid etching can clear away a majority of surface flaws smaller than 1 micron, and that while acid etching may not remove larger flaws, the acid etching procedure will tend to round the flaw tip which would otherwise dramatically decrease the stress concentration factor. US20140162036 concludes that improvement in glass surface (e.g., removal of small surface flaws and rounding the tips of larger flaws) can dramatically increase glass strength, such as impact resistance, and if only a relatively small depth of glass is removed, that will not result in significant compressive stress drop in the glass sheet which has relatively high compressive stress at a much larger depth into the glass sheet such as 40 microns from the surface.

Therefore, it was surprising that contacting a strengthened glass substrate with a compressive stress layer with etching or stripping solution to remove organic and/or inorganic layers caused the substrate to have a reduced compressive stress at the surface.

The present disclosure provides a methods of etching an inorganic layer on a glass substrate. In one embodiment, a method comprises contacting the glass substrate including an inorganic layer with an etching solution including a polar organic solvent and an etchant. The inorganic layer is removed at an inorganic layer etching rate and the glass substrate is etched as a glass etching rate. The polar solvent is selected to promote etching of the inorganic layer and control the glass etching rate. The etchant can be any suitable etchant to remove inorganic layers from a glass substrate, particularly antireflective layers that contain titanium such as titanium dioxide and titanium carbide. In one or more embodiments, the etchant is selected from HCl, $NH_4HF_2$, HF, NaOH, KOH, tetramethyl ammonium hydroxide, and combinations thereof.

It was found that the addition of a polar organic solvent to an etching solution containing an etchant and water reduced the etching rate of glass substrates containing inorganic and organic layers. In particular, it was found that the addition of one or more lower aliphatic alcohols and lower alkylene glycols, where "lower" refers to five or fewer carbon atoms, reduced the etching rate of the glass and prevented reduction of the compressive stress at the surface of the glass substrate. Suitable polar organic solvents include but are not limited to the polar organic solvent is selected from the group consisting of methanol, ethanol, propanol, propylene glycol, ethylene glycol, and mixtures thereof.

According to one or more embodiments, methods of etching an inorganic layer on a glass substrate include contacting the glass substrate containing an inorganic layer such as an antireflective layer containing titanium with an etching solution which comprises polar organic solvent in the range of 10 wt. % to 80 wt. %, etchant and water. The etchant can be any suitable etchant used to remove inorganic layers, for example, HCl, $NH_4HF_2$, HF, NaOH, KOH, tetramethyl ammonium hydroxide, and combinations thereof. The etchant can be present in any suitable amount, and the amount can be adjusted to provide the desired etching rate. Suitable amounts include 10%, 15%, 20%, 25%, 30%, 35%, 40%, 45%, 50%, 55%, 60%, 65%, 70%, 75%, and 80% by weight of the etching solution, including ranges including each of these values, such as 15% to 80% by weight, 15% to 70% by weight, 15% to 65% by weight, 15% to 60% by weight, 15% to 55% by weight, 15% to 50% by weigh, 15% to 45% by weight, 15% to 40% by weight, 15% to 35% by weight, 15% to 30% by weigh and 15% to 25% by weight. An exemplary range of polar solvent in the etching solution is in the range of 25 wt. % to 75 wt. %, where the solution further includes etchant and water.

In specific embodiments, the etchant comprises 10% NaOH in water and the polar solvent comprises propylene glycol. In other specific embodiments, the glass substrate containing the inorganic layer is contacted with the etching solution at a temperature in the range of 25° C. to 100° C. for a period of time ranging from 30 seconds to 10 minutes, or 30 seconds to 9 minutes, or 30 seconds to 8 minutes or 30 seconds to 7 minutes or 30 seconds to 6 minutes, or 30 seconds to 5 minutes or 30 seconds to 4 minutes or 30 seconds to 3 minutes. It will be appreciated that the time and temperature can be adjusted to achieve the desired reduction in etching rate of the glass and to provide a substrate in which the reduction in compressive stress at the surface is acceptable or eliminated.

As described above, the glass substrate can be a thermally and/or a chemically strengthened glass composition with a compressive stress layer having a compressive depth of layer. A chemically strengthened glass composition can be ion exchanged to a depth of layer of at least about 10 μm, at least about 20 μm, at least about 30 μm, at least about 40 μm, at least about 50 μm, at least about 60 μm, at least about 70 μm, or at least about 80 μm.

In chemically strengthened glass substrates, the replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following approximate relationship (Equation 1):

$$CT \simeq \frac{CS \times DOL}{\text{thickness} - 2 \times DOL}$$

where thickness is the total thickness of the strengthened glass substrate and compressive depth of layer (DOL) is the depth of exchange. Depth of exchange may be described as the depth within the strengthened glass or glass ceramic substrate (i.e., the distance from a surface of the glass substrate to an interior region of the glass or glass ceramic substrate), at which ion exchange facilitated by the ion exchange process takes place. Unless otherwise specified, central tension CT and compressive stress CS are expressed herein in megaPascals (MPa), whereas thickness and depth of layer DOL are expressed in millimeters or microns. It will be appreciated that CT is dependent on three parameters—CS, DOL and thickness.

As used herein, the terms "depth of layer" and "DOL" refer to the depth of the compressive layer as determined by surface stress meter (FSM) measurements using commercially available instruments such as the FSM-6000.

As used herein, the terms "depth of compression" and "DOC" refer to the depth at which the stress within the glass changes from compressive to tensile stress. At the DOC, the stress crosses from a positive (compressive) stress to a negative (tensile) stress and thus has a value of zero.

As described herein, compressive stress (CS) and central tension (CT) are expressed in terms of megaPascals (MPa), depth of layer (DOL) and depth of compression (DOC) are expressed in terms of microns (μm), where 1 μm=0.001 mm, and thickness t is expressed herein in terms of millimeters, where 1 mm=1000 μm, unless otherwise specified.

Compressive stress CS and depth of layer DOL are stress profile parameters that have been used for years to enable quality control of chemical strengthening. Compressive stress CS provides an estimate of the surface compression, an important parameter that correlates well with the amount of stress that needs to be applied to cause a failure of a glass article, particularly when the glass is free of substantially deep mechanical flaws. Depth of layer DOL has been used as an approximate measure of the depth of penetration of the larger (strengthening) cation (e.g., $K^+$ during $K^+$ for $Na^+$ exchange), with larger DOL correlating well with greater depths of the compression layer, protecting the glass by arresting deeper flaws, and preventing flaws from causing failure under conditions of relatively low externally applied stress.

Ion exchange is commonly used to chemically strengthen glasses. In one particular example, alkali cations within a source of such cations (e.g., a molten salt, or "ion exchange," bath) are exchanged with smaller alkali cations within the glass to achieve a layer that is under a compressive stress (CS) near the surface of the glass. For example, potassium ions from the cation source are often exchanged with sodium ions within the glass. The compressive layer extends from the surface to a depth within the glass.

The compressive stress is created by chemically strengthening the glass article, for example, by the ion exchange processes previously described herein, in which a plurality of first metal ions in the outer region of the glass article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

According to one or more embodiments, a method of etching a glass substrate having an inorganic layer, for example, an antireflective layer containing titanium is particularly beneficial in etching or removing an inorganic layer from a glass described in U.S. Pat. No. 8,765,262, the entire content of which is incorporated herein by reference. Thus, the methods of etching described herein can be utilized on a glass substrate which comprises an alkali aluminosilicate glass comprising at least about 4 mol % $P_2O_5$. In specific embodiments, methods described herein can be used on a substrate comprised of an alkali aluminosilicate glass which comprises from about 40 mol % to about 70 mol % $SiO_2$; from about 11 mol % to about 25 mol % $Al_2O_3$; from about 4 mol % to about 15 mol % $P_2O_5$; from about 13 mol % to about 25 mol % $Na_2O$; from about 13 to about 30 mol % $R_xO$; from about 11 to about 30 mol % $M_2O_3$; from 0 mol % to about 1 mol % $R_2O$; from 0 mol % to about 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; wherein $R_xO$ is the sum of the alkali metal oxides, alkaline earth metal oxides, and transition metal monoxides present in the glass. In one or more embodiments, the methods described herein are useful for etching a layer from a glass substrate which comprises a glass composition that is an alkali aluminosilicate glass comprising at least about 4 mol % $P_2O_5$ wherein the glass is lithium-free; and $1.3<[(P_2O_5+R_2O)/M_2O_3]\leq2.3$; where $M_2O_3=Al_2O_3+B_2O_3$, and $R_2O$ is the sum of monovalent cation oxides present in the glass. In one or more embodiments, the alkali aluminosilicate glass has a compressive layer extending from a surface of the glass to the depth of layer, and wherein the compressive layer is under a compressive stress of at least about 300 MPa, or at least about 500 MPa.

According to one or more embodiments, a method of etching a glass substrate having an inorganic layer, for example, an antireflective layer containing titanium is particularly beneficial in etching or removing an inorganic layer from a glass described in U.S. Pat. No. 8,759,238, the entire content of which is incorporated herein by reference. Thus, the methods of etching described herein can be utilized on a glass substrate which comprises an alkali aluminosilicate glass free of lithium and comprises 0.1-10 mol % $P_2O_5$ and at least 5 mol % $Al_2O_3$. According to one or more embodiments, the glass is ion exchanged to a depth of layer of at least about 30 µm. In one or more embodiments, the alkali aluminosilicate glass has a compressive layer extending from a surface of the glass to the depth of layer, and wherein the compressive layer is under a compressive stress of at least about 300 MPa, or at least about 500 MPa.

According to one or more embodiments, a method of etching a glass substrate having an inorganic layer, for example, an antireflective layer containing titanium is particularly beneficial in etching or removing an inorganic layer from a glass substrate comprising an alkali aluminosilicate glass which comprises up to about 10 mol % $Li_2O$. In one or more embodiments, the alkali aluminosilicate glass comprises at least about 4 mol % $P_2O_5$ and from 0 mol % to about 4 mol % $B_2O_3$, wherein $1.3<[(P_2O_5+R_2O)/M_2O_3] \leq 2.3$, where $M_2O_3=Al_2O_3+B_2O_3$, and $R_2O$ is the sum of monovalent cation oxides present in the alkali aluminosilicate glass. In one or more embodiments, the glass is ion exchanged to a depth of layer of at least about 30 µm. In one or more embodiments, the alkali aluminosilicate glass has a compressive layer extending from a surface of the glass to the depth of layer, and wherein the compressive layer is under a compressive stress of at least about 300 MPa, or at least about 500 MPa.

According to one or more embodiments, a method of etching a glass substrate having an inorganic layer, for example, an antireflective layer containing titanium is particularly beneficial in etching or removing an inorganic layer from a glass substrate which comprises a glass composition which is an alkali aluminosilicate glass and comprises alumina, $B_2O_3$, and alkali metal oxides, and contains boron cations having three-fold coordination. In one or more embodiments, the glass substrate has a Vickers crack initiation threshold of at least 7 kilogram force (kgf). In one or more embodiments, the glass is ion exchanged to a depth of layer of at least about 30 µm. In one or more embodiments, the alkali aluminosilicate glass has a compressive layer extending from a surface of the glass to the depth of layer, and wherein the compressive layer is under a compressive stress of at least about 300 MPa. In one or more embodiments, the compressive stress is at least about 500 MPa An embodiment pertains to a method of controlling the etch rate of a glass substrate including an inorganic layer, the method comprising contacting the glass substrate including the inorganic layer with an etching solution comprising a polar organic solvent and an etchant selected from HCl, $NH_4HF_2$, HF, NaOH, KOH, tetramethyl ammonium hydroxide, and combinations thereof, wherein the inorganic layer includes titanium and the inorganic layer is removed at an inorganic layer etching rate and the glass substrate is etched as a glass etching rate and the glass substrate comprises an ion exchanged glass composition with a compressive stress layer having a compressive depth of layer of at least 10 µm and extending from a surface of the glass to the depth of layer, and wherein the compressive layer is under a compressive stress of at least about 300 MPa. In one or more embodiments, the polar organic solvent is selected from the group consisting of methanol, ethanol, propanol, propylene glycol, ethylene glycol, and mixtures thereof and is present in the solution in a range of from about 25 wt. % and 75 wt. %.

In one or more embodiments, etching a glass substrate having an inorganic layer, for example, an antireflective layer containing titanium is particularly beneficial in etching or removing an inorganic layer from a glass substrate comprises alkali aluminosilicate glass which comprises or consists essentially of at least one of alumina and boron oxide, and at least one of an alkali metal oxide and an alkali earth metal oxide, wherein $-15$ mol $\% \leq (R_2O+R'O-Al_2O_3-ZrO_2)-B_2O_3 \leq 4$ mol %, where R is one of Li, Na, K, Rb, and Cs, and R' is at least one of Mg, Ca, Sr, and Ba. In some embodiments, the alkali aluminosilicate glass comprises or consists essentially of: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. In some embodiments, the glass comprises alumina and boron oxide and at least one alkali metal oxide, wherein $-15$ mol % $(R_2O+R'O-Al_2O_3-ZrO_2)-B_2O_3 \leq 4$ mol %, where R is at least one of Li, Na, K, Rb, and Cs, and R' is at least one of Mg, Ca, Sr, and Ba; wherein $10 \leq Al_2O_3+B_2O_3+ZrO_2 \leq 30$ and $14 \leq R_2O+R'O \leq 25$; wherein the silicate glass comprises or consists essentially of: 62-70 mol. % $SiO_2$; 0-18 mol % $Al_2O_3$; 0-10 mol % $B_2O_3$; 0-15 mol % $Li_2O$; 6-14 mol % $Na_2O$; 0-18 mol % $K_2O$; 0-17 mol % MgO; 0-18 mol % CaO; and 0-5 mol % $ZrO_2$. The glass is described in U.S. Pat. Nos. 8,969,226 and 8,652,978 filed Aug. 17, 2012, by Matthew J. Dejneka et al., and entitled "Glasses Having Improved Toughness And Scratch Resistance," both claiming priority to U.S. Provisional Patent Application No. 61/004,677, filed on Nov. 29, 2008. The contents of all of the above patent and patent application are incorporated herein by reference in their entirety.

In another embodiment, etching a glass substrate having an inorganic layer, for example, an antireflective layer containing titanium is particularly beneficial in etching or removing an inorganic layer from a glass substrate which comprises an alkali aluminosilicate glass which comprises or consists essentially of: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol % $Li_2O+Na_2O+K_2O \leq 20$ mol % and 0 mol % $\leq MgO+CaO \leq 10$ mol %. In some embodiments, the alkali aluminosilicate glass comprises or consists essentially of: 60-70 mol % $SiO_2$; 6-14 mol % $Al_2O_3$; 0-3 mol % $B_2O_3$; 0-1 mol % $Li_2O$; 8-18 mol % $Na_2O$; 0-5 mol % $K_2O$; 0-2.5 mol % CaO; greater than 0 mol % to 3 mol % $ZrO_2$; 0-1 mol % $SnO_2$; and 0-1 mol % $CeO_2$, wherein 12 mol % $<Li_2O+Na_2O+K_2O \leq 20$ mol %, and wherein the silicate glass comprises less than 50 ppm $As_2O_3$. In some embodiments, the alkali aluminosilicate glass comprises or consists essentially of: 60-72 mol % $SiO_2$; 6-14 mol % $Al_2O_3$; 0-3 mol % $B_2O_3$; 0-1 mol % $Li_2O$; 0-20 mol % $Na_2O$; 0-10 mol % $K_2O$; 0-2.5 mol % CaO; 0-5 mol % $ZrO_2$; 0-1 mol % $SnO_2$; and 0-1 mol % $CeO_2$, wherein 12 mol % $\leq Li_2O+Na_2O+K_2O \leq 20$ mol %, and wherein the silicate glass comprises less than 50 ppm $As_2O_3$ and less than 50 ppm $Sb_2O_3$. The glass is described in U.S. Pat. No. 8,158,543 by Sinue Gomez et al., entitled "Fining Agents for Silicate Glasses," filed on Feb. 25, 2009; U.S. Pat. No. 8,431,502 by Sinue Gomez et al., entitled "Silicate Glasses Having Low Seed Concentration," filed Jun. 13, 2012; and U.S. Pat. No. 8,623,776, by Sinue Gomez et al., entitled "Silicate Glasses Having Low Seed Concentration," filed Jun. 19, 2013, all of which claim priority to U.S. Provisional Patent Application No. 61/067,130, filed on Feb. 26, 2008. The contents of all of the above U.S. patents are incorporated herein by reference in their entirety.

In another embodiment, etching a glass substrate having an inorganic layer, for example, an antireflective layer containing titanium is particularly beneficial in etching or removing an inorganic layer from a glass substrate comprising an alkali aluminosilicate glass which comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises or consists essentially of: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and from 0 mol % to about 3 mol % CaO. The glass is described in U.S. Pat. No. 8,802,581 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009. The contents of the above patent and patent application are incorporated herein by reference in their entirety.

In another embodiment, etching a glass substrate having an inorganic layer, for example, an antireflective layer containing titanium is particularly beneficial in etching or removing an inorganic layer from a glass substrate comprises an alkali aluminosilicate glass which comprises at least 50 mol % $SiO_2$ and at least one modifier selected from the group consisting of alkali metal oxides and alkaline earth metal oxides, wherein $[(Al_2O_3 (mol \%)+B_2O_3(mol \%))/(\Sigma$ alkali metal modifiers (mol %))]>1. In some embodiments, the alkali aluminosilicate glass comprises or consists essentially of: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. In some embodiments, the glass comprises or consists essentially of: at least 58 mol % $SiO_2$; at least 8 mol % $Na_2O$; from 5.5 mol % to 12 mol % $B_2O_3$; and $Al_2O_3$, wherein $[(Al_2O_3 (mol \%)+B_2O_3 (mol \%))/(\Sigma$ alkali metal modifiers (mol %))]>1, $Al_2O_3$(mol %)>$B_2O_3$(mol %), 0.9<$R_2O/Al_2O_3$<1.3. The glass is described in U.S. Pat. No. 8,586,492, entitled "Crack And Scratch Resistant Glass and Enclosures Made Therefrom," filed Aug. 18, 2010, by Kristen L. Barefoot et al., and U.S. patent application Ser. No. 14/082,847, entitled "Crack And Scratch Resistant Glass and Enclosures Made Therefrom," filed Nov. 18, 2013, by Kristen L. Barefoot et al., both claiming priority to U.S. Provisional Patent Application No. 61/235,767, filed on Aug. 21, 2009. The contents of the above patent and patent applications are incorporated herein by reference in their entirety.

In another embodiment, etching a glass substrate having an inorganic layer, for example, an antireflective layer containing titanium is particularly beneficial in etching or removing an inorganic layer from a glass substrate which comprises an alkali aluminosilicate glass which comprises $SiO_2$, $Al_2O_3$, $P_2O_5$, and at least one alkali metal oxide ($R_2O$), wherein $0.75 \leq [(P_2O_5(mol \%)+R_2O (mol \%))/M_2O_3 (mol \%)] \leq 1.2$, where $M_2O_3=Al_2O_3+B_2O_3$. In some embodiments, the alkali aluminosilicate glass comprises or consists essentially of: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$ and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. The glass is described in U.S. patent application Ser. No. 13/305,271 (published as United States Patent Application Publication No. 20120135226) by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010. The contents of the above patent applications are incorporated herein by reference in their entirety.

In still another embodiment, etching a glass substrate having an inorganic layer, for example, an antireflective layer containing titanium is particularly beneficial in etching or removing an inorganic layer from a glass substrate which comprises an alkali aluminosilicate glass which comprises at least about 50 mol % $SiO_2$ and at least about 11 mol % $Na_2O$, and has a surface compressive stress of at least about 900 MPa. In some embodiments, the glass further comprises $Al_2O_3$ and at least one of $B_2O_3$, $K_2O$, MgO and ZnO, wherein $-340+27.1.Al_2O_3-28.7.B_2O_3+15.6.Na_2O-61.4.K_2O+8.1.(MgO+ZnO) \geq 0$ mol %. In particular embodiments, the glass comprises or consists essentially of: from about 7 mol % to about 26 mol % $Al_2O_3$, from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. patent application Ser. No. 13/533,298 (published as United States Patent Application Publication No. 20130004758), by Matthew J. Dejneka et al., entitled "Ion Exchangeable Glass with High Compressive Stress," filed Jun. 26, 2012, and claiming priority to U.S. Provisional Patent Application No. 61/503,734, filed Jul. 1, 2011. The contents of the above patent applications are incorporated herein by reference in their entirety.

In other embodiments, etching a glass substrate having an inorganic layer, for example, an antireflective layer containing titanium is particularly beneficial in etching or removing an inorganic layer from a glass substrate which comprises an alkali aluminosilicate glass which is ion exchangeable and comprises: at least about 50 mol % $SiO_2$; at least about 10 mol % $R_2O$, wherein $R_2O$ comprises $Na_2O$; $Al_2O_3$; and $B_2O_3$, wherein $B_2O_3$—($R_2O$—$Al_2O_3$)$\geq 3$ mol %. In some embodiments, the glass comprises: at least about 50 mol % $SiO_2$; at least about 10 mol % $R_2O$, wherein $R_2O$ comprises $Na_2O$; $Al_2O_3$, wherein $Al_2O_3$(mol %)<$R_2O$ (mol %); and from 3 mol 5 to 4.5 mol % $B_2O_3$, wherein $B_2O_3$(mol %)-($R_2O$ (mol %)-$Al_2O_3$(mol %))$\geq 3$ mol %. In certain embodiments, the glass comprises or consists essentially of: at least about 50 mol % $SiO_2$; from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein $0 \leq MgO \leq 6$ and $0 \leq ZnO \leq 6$ mol %; and, optionally, at least one of CaO, BaO, and SrO, wherein 0 mol %≤CaO+SrO+BaO≤2 mol %. When ion exchanged, the glass, in some embodiments, has a Vickers crack initiation threshold of at least about 10 kgf. Such glasses are described in U.S. patent application Ser. No. 14/197,658, filed May 28, 2013, by Matthew J. Dejneka et al., entitled "Zircon Compatible, Ion Exchangeable Glass with High Damage Resistance," which is a continuation of U.S. patent application Ser. No. 13/903,433 (published as United States Patent Application Publication No. 20140186632), filed May 28, 2013, by Matthew J. Dejneka et al., entitled "Zircon Compatible, Ion Exchangeable Glass with High Damage Resistance," both claiming priority to Provisional Patent Application No. 61/653,489, filed May 31, 2012. The contents of these patent applications are incorporated herein by reference in their entirety.

In some embodiments, etching a glass substrate having an inorganic layer, for example, an antireflective layer containing titanium is particularly beneficial in etching or removing an inorganic layer from a glass substrate which comprises a glass which comprises: at least about 50 mol % $SiO_2$; at least about 10 mol % $R_2O$, wherein $R_2O$ comprises $Na_2O$; $Al_2O_3$, wherein $-0.5$ mol %≤$Al_2O_3$(mol %)-$R_2O$ (mol %)≤2 mol %; and $B_2O_3$, and wherein $B_2O_3$(mol %)-($R_2O$ (mol %)-$Al_2O_3$ (mol %))≥4.5 mol %. In other embodiments, the glass has a zircon breakdown temperature that is equal to the temperature at which the glass has a viscosity of greater than about 40 k Poise and comprises: at least about 50 mol % $SiO_2$; at least about 10 mol % $R_2O$, wherein $R_2O$ comprises $Na_2O$; $Al_2O_3$; and $B_2O_3$, wherein $B_2O_3$(mol %)-($R_2O$ (mol %)-$Al_2O_3$(mol %))≥4.5 mol %. In still other embodiments, the glass is ion exchanged, has a Vickers crack initiation threshold of at least about 30 kgf, and comprises: at least about 50 mol % $SiO_2$; at least about 10 mol % $R_2O$, wherein $R_2O$ comprises $Na_2O$; $Al_2O_3$, wherein $-0.5$ mol %≤$Al_2O_3$ (mol %)-$R_2O$ (mol %)≤2 mol %; and $B_2O_3$, wherein $B_2O_3$ (mol %)-($R_2O$ (mol %)-$Al_2O_3$(mol %))≥4.5 mol %. Such glasses are described in U.S. patent application Ser. No. 13/903,398 (published as United States Patent Application Publication No. 20140106172), by Matthew J. Dejneka et al., entitled "Ion Exchangeable Glass with High Damage Resistance," filed May 28, 2013, claiming priority from U.S. Provisional Patent Application No. 61/653,485, filed May 31, 2012. The contents of these patent applications are incorporated herein by reference in their entirety.

In certain embodiments, etching a glass substrate having an inorganic layer, for example, an antireflective layer containing titanium is particularly beneficial in etching or removing an inorganic layer from a glass substrate which comprises an alkali aluminosilicate glass which comprises at least about 4 mol % $P_2O_5$, wherein ($M_2O_3$ (mol %)/$R_xO$ (mol %))<1, wherein $M_2O_3$=$Al_2O_3$+$B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass is lithium-free and consists essentially of from about 40 mol % to about 70 mol % $SiO_2$; from about 11 mol % to about 25 mol % $Al_2O_3$; from about 4 mol % to about 15 mol % $P_2O_5$; from about 13 mol % to about 25 mol % $Na_2O$; from about 13 to about 30 mol % $R_xO$, where wherein $R_xO$ is the sum of the alkali metal oxides, alkaline earth metal oxides, and transition metal monoxides present in the glass; from about 11 to about 30 mol % $M_2O_3$, where $M_2O_3$=$Al_2O_3$+$B_2O_3$; from 0 mol % to about 1 mol % $K_2O$; from 0 mol % to about 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; the glass is lithium-free; and $1.3<[(P_2O_5+R_2O)/M_2O_3]≤2.3$, where $R_2O$ is the sum of monovalent cation oxides present in the glass. The glass is described in U.S. patent application Ser. No. 13/678,013 (published as United States Patent Application Publication No. 20130122284) by Timothy M. Gross, entitled "Ion Exchangeable Glass with High Crack Initiation Threshold," filed Nov. 15, 2012, and U.S. Pat. No. 8,756,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of the above patent and applications are incorporated herein by reference in their entirety.

In some embodiments, the glasses used in the process described herein are substantially free of at least one of arsenic, antimony, barium, strontium, bismuth, and their compounds. In other embodiments, the glasses may include up to about 0.5 mol % $Li_2O$, or up to about 5 mol % $Li_2O$ or, in some embodiments, up to about 10 mol % $Li_2O$. in still other embodiments, the glass may be free of $Li_2O$.

In some embodiments, the glasses used in the process described herein, when ion exchanged, are resistant to introduction of flaws by sharp or sudden impact. Accordingly, these ion exchanged glasses exhibit Vickers crack initiation threshold of at least about 10 kilogram force (kgf). In certain embodiments, these glasses exhibit a Vickers crack initiation threshold of at least 20 kgf and, in some embodiments, at least about 30 kgf, and up to 50 kgf.

The glasses used in the process described herein may, in some embodiments, be down-drawable by processes known in the art, such as slot-drawing, fusion drawing, re-drawing, and the like, and have a liquidus viscosity of at least 130 kilopoise. In addition to those compositions listed hereinabove, various other ion exchangeable alkali aluminosilicate glass compositions may be used.

The strengthened glasses used in the process described herein are considered suitable for various two- and three-dimensional shapes and may be utilized in various applications, and various thicknesses are contemplated herein. In some embodiments, the glass article has a thickness in a range from about 0.1 mm up to about 2.0 mm. In some embodiments, the glass article has a thickness in a range from about 0.1 mm up to about 1.0 mm and, in certain embodiments, from about 0.1 mm up to about 0.5 mm.

Strengthened glass substrates used in the process described herein may also be defined by their central tension CT. In one or more embodiments, the strengthened glass articles described herein have a CT≤150 MPa, or a CT≤125 MPa, or CT≤100 MPa. The central tension of the strengthened glass correlates to the frangible behavior of the strengthened glass article.

The following non-limiting examples are illustrative of one or more embodiments.

EXAMPLES

Example 1

Glass substrates, which were 1 mm thick and comprising a composition which included 57.5 mol % $SiO_2$, 16.5 mol % $Al_2O_3$, 16.5 mol % $Na_2O$, 2.8 mol % MgO, 6.5 mol % $P_2O_5$, and 0.05 mol % $SnO_2$ were exposed to various etchant solutions with the following results. The etching solutions comprised the etchant listed in water at the concentration listed below

| Etchant | Weight loss/cm² |
| --- | --- |
| HCl 5% 24 hr 95° C. | 50.02 mg/cm² |
| NH4:HF 10% 20 min 20° C. | 4.58 mg/cm² |
| HF 10% 20 min 20° C. | 37.89 mg/cm² |
| NaOH 10% 6 hr 95° C. | 5.8 mg/cm² |

Example 2

Figure 2:
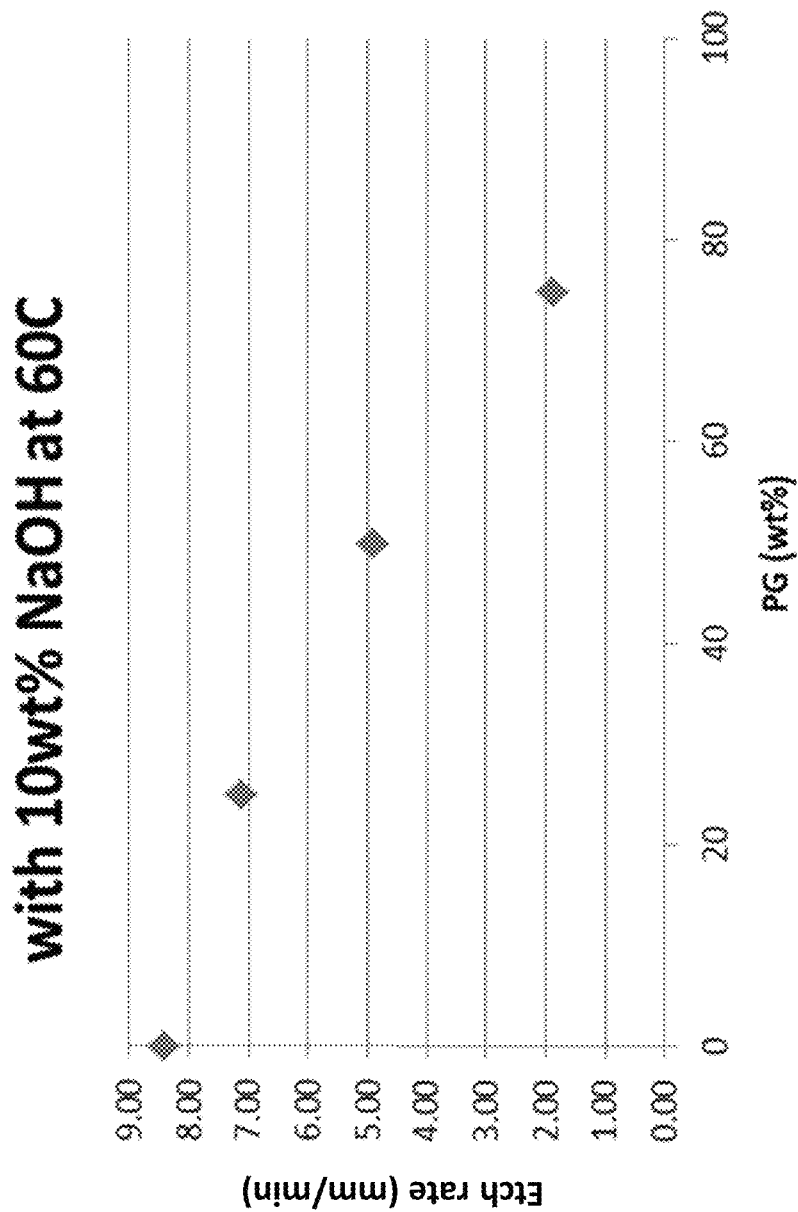
FIG. 2 is graph showing etch rate versus weight percent of propylene glycol.

Four different ion exchanged glass substrates having the same composition used in Example 1 were exposed to an etching solution NaOH 10% in water at 60° C. A first sample was exposed to the solution without the addition of propylene glycol. A second sample included 25% by weight propylene glycol added to the etching solution. A third sample included 50% by weight propylene glycol added to the etching solution, and a fourth sample included 75% by weight propylene glycol added to the etching solution. FIG. 2 shows the etching rates for each of the four etching solutions. FIG. 2 shows that the etching rate of the glass can be controlled by the addition of a polar organic solvent, propylene glycol.

Example 3

Figure 3:
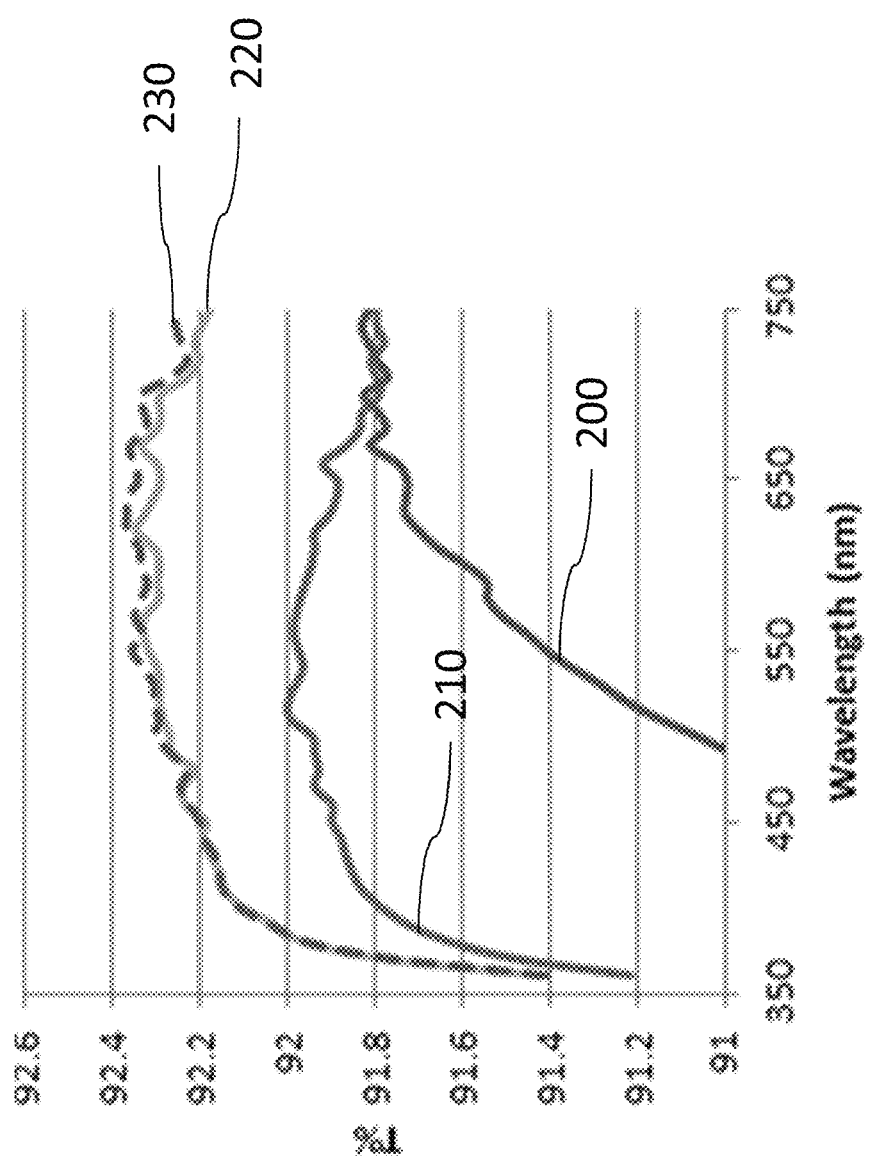
FIG. 3 is a graph showing transmission versus wavelength through various glass substrates.

Four different glass substrates having the same composition used in Example 1 were exposed to an etching solution. The transmittance spectra of the substrates were measured at the wavelengths shown in FIG. 3. Line 200 shows the transmittance spectrum for a 0.7 mm thick ion exchanged substrate having a 10 nm $TiO_2$ coating after exposure to an etchant. Line 210 in FIG. 3 shows the spectra for a 0.55 mm thick glass substrate that was not ion exchanged and did not contain a coating. Line 220 shows the transmittance spectra for a 0.7 mm thick ion exchanged substrate having a 10 nm $TiO_2$ etched by an etching solution comprising 10 wt % NaOH in water and containing 50 wt % propylene glycol at 60° C. for 2 minutes. Line 230 shows the transmittance spectra a 0.7 mm thick ion exchanged substrate having a 10 nm $TiO_2$ layer etched by an etching solution comprising 10 wt % NaOH containing 75 wt % PG at 60 C for 2 min. The Transmittance spectra suggested that the 10 nm-$TiO_2$ coating film can be effectively removed by 10 wt % NaOH in water and containing 75 wt % propylene glycol at 60° C. for 2 minutes. FIG. 3 indicates that the 10 nm-$TiO_2$ layer can be effectively removed by 10 wt % NaOH in water containing to 75 wt % of propylene glycol at 60° C. for 2 minutes. It is expected that other polar organic solvents in various weight ranges will provide effective results for other etching solutions containing the etchants described herein.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of controlling the etch rate of a glass substrate including an inorganic layer, the method comprising contacting the glass substrate including the inorganic layer with an etching solution comprising a polar organic solvent and an etchant selected from HCl, $NH_4HF_2$, HF, NaOH, KOH, tetramethyl ammonium hydroxide, and combinations thereof, wherein the inorganic layer includes titanium and the inorganic layer is removed at an inorganic layer etching rate and the glass substrate is etched as a glass etching rate and the glass substrate comprises an ion exchanged glass composition with a compressive stress layer having a compressive depth of layer of at least 10 μm and extending from a surface of the glass to the depth of layer, and wherein the compressive layer is under a compressive stress of at least about 300 MPa.

2. The method of claim 1, wherein the polar organic solvent is selected from the group consisting of methanol, ethanol, propanol, propylene glycol, ethylene glycol, and mixtures thereof and is present in the solution in a range of from about 25 wt. % and 75 wt. %.

3. The method of claim 2, wherein the ion exchanged glass composition is an alkali aluminosilicate glass and further comprises up to about 10 mol % $Li_2O$.

4. The method of claim 3, wherein the alkali aluminosilicate glass comprises at least about 4 mol % $P_2O_5$ and from 0 mol % to about 4 mol % $B_2O_3$, wherein $1.3<[(P_2O_5+R_2O)/M_2O_3]\leq2.3$, where $M_2O_3=Al_2O_3+B_2O_3$, and $R_2O$ is the sum of monovalent cation oxides present in the alkali aluminosilicate glass.

5. The method of claim 2, wherein the ion exchanged glass composition is an alkali aluminosilicate glass and comprises alumina, $B_2O_3$, and alkali metal oxides, and contains boron cations having three-fold coordination.

6. The method of claim 5, wherein the glass substrate has a Vickers crack initiation threshold of at least 7 kilogram force (kgf).

7. The method of claim 1, wherein the polar organic solvent is selected to reduce the glass etching rate.

8. The method of claim 1, wherein the polar organic solvent is selected from the group consisting of lower aliphatic alcohols and lower alkylene glycols.

9. The method of claim 1, wherein the polar organic solvent is selected from the group consisting of methanol, ethanol, propanol, propylene glycol, ethylene glycol, and mixtures thereof.

10. The method of claim 9, wherein the etching solution comprises the polar organic solvent in the range of 10 wt. % to 80 wt. %, and further comprises water.

11. The method of claim 9, wherein the etching solution comprises the polar organic solvent in the range of 25 wt. % to 75 wt. %, and further comprises water.

12. The method of claim 11, wherein the etchant comprises 10% NaOH in water and the polar organic solvent comprises propylene glycol.

13. The method of claim 12, wherein the glass substrate is contacted with the etching solution at a temperature in the range of 25° C. to 100° C. for a period of time ranging from 30 seconds to 5 minutes.

14. The method of claim 1, wherein the glass substrate is contacted with the etching solution at a temperature in the range of 25° C. to 100° C. for a period of time ranging from 30 seconds to 5 minutes.

15. The method of claim 1, wherein the ion exchanged glass composition is an alkali aluminosilicate glass comprising at least about 4 mol % $P_2O_5$.

16. The method of claim 1, wherein the ion exchanged glass composition comprises from about 40 mol % to about 70 mol % $SiO_2$; from about 11 mol % to about 25 mol % $Al_2O_3$; from about 4 mol % to about 15 mol % $P_2O_5$; from about 13 mol % to about 25 mol % $Na_2O$; from about 13 to about 30 mol % $R_xO$; from about 11 to about 30 mol %

$M_2O_3$; from 0 mol % to about 1 mol % $K_2O$; from 0 mol % to about 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; wherein $R_xO$ is the sum of the alkali metal oxides, alkaline earth metal oxides, and transition metal monoxides present in the glass.

17. The method of claim 16, wherein the ion exchanged glass composition is lithium-free; and $1.3<[(P_2O_5+R_2O)/M_2O_3]\leq 2.3$; where $M_2O_3=Al_2O_3+B_2O_3$, and $R_2O$ is the sum of monovalent cation oxides present in the glass.

18. The method of claim 16, wherein the depth of layer is at least 30 μm.

19. The method of claim 16, wherein the compressive stress is at least about 500 MPa.

20. The method of claim 1, wherein the ion exchanged glass composition is an alkali aluminosilicate glass free of lithium and comprises 0.1-10 mol % $P_2O_5$ and at least 5 mol % $Al_2O_3$.

21. The method of claim 20, wherein the depth of layer is at least 30 μm.

22. The method of claim 20, wherein the compressive stress is at least about 500 MPa.

23. The method of claim 4, wherein the depth of layer is at least 30 μm.

24. The method of claim 4, wherein the compressive stress is at least about 500 MPa.

25. The method of claim 6, wherein the depth of layer is at least 30 μm.

26. The method of claim 6, wherein the compressive stress is at least about 500 MPa.

27. The method of claim 1, wherein the inorganic layer comprises $TiO_2$.

28. The method of claim 1, wherein the inorganic layer comprises TiC.

29. The method of claim 1, wherein the inorganic layer further comprises $Al_2O_3$.

* * * * *

UNITED STATES PATENT AND TRADEMARK OFFICE
CERTIFICATE OF CORRECTION

PATENT NO. : 10,894,739 B2
APPLICATION NO. : 15/356785
DATED : January 19, 2021
INVENTOR(S) : Yuhui Jin et al.

Page 1 of 1

It is certified that error appears in the above-identified patent and that said Letters Patent is hereby corrected as shown below:

On the Title Page

On page 2, in Column 2, item (56), Other Publications, Line 3, delete "201680068501X" and insert -- 20168006850.X --, therefor.

In the Claims

In Column 15, Line 3, Claim 16, delete "$Nb_2O_s$," and insert -- $Nb_2O_5,$ --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*